United States Patent
Annehed et al.

(10) Patent No.: US 7,032,363 B1
(45) Date of Patent: Apr. 25, 2006

(54) LINEAR FITMENT APPLICATOR AND METHOD

(75) Inventors: Stefan Annehed, Ham Lake, MN (US); Hisami Mitsuishi, Blaine, MN (US); Martin Fuzik, Eden Prairie, MN (US); Petr Sevcik, Cambridge, MN (US); Steve Kendrick, Blaine, MN (US)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

(21) Appl. No.: 10/968,086

(22) Filed: Oct. 19, 2004

(51) Int. Cl.
*B65B 61/18* (2006.01)
(52) U.S. Cl. .................. 53/412; 53/133.2; 53/DIG. 2; 493/87; 156/69; 156/580.1
(58) Field of Classification Search ............... 53/133.1, 53/133.2, 133.4, 410, 412, DIG. 2; 493/87, 493/102, 212, 213; 156/69, 580.1, 580.2
See application file for complete search history.

(56) References Cited

U.S. PATENT DOCUMENTS

| | | | |
|---|---|---|---|
| 4,037,370 A | 7/1977 | Williams | |
| 4,608,806 A | 9/1986 | Haslam et al. | |
| 5,058,360 A | 10/1991 | Yamazaki et al. | |
| 5,304,265 A | 4/1994 | Keeler | |
| 5,435,803 A * | 7/1995 | Owen et al. | 493/87 |
| 5,473,857 A | 12/1995 | Keeler | |
| 5,819,504 A | 10/1998 | Giacomelli et al. | |
| 5,983,599 A | 11/1999 | Krueger | |
| 6,012,267 A | 1/2000 | Katsumata | |
| 6,066,081 A * | 5/2000 | Bachner | 493/102 |
| 6,079,185 A * | 6/2000 | Palaniappan et al. | 53/412 |
| 6,145,275 A * | 11/2000 | Sweeney | 53/412 |
| RE37,025 E | 1/2001 | Moody et al. | |
| 6,321,813 B1 * | 11/2001 | Miyajima et al. | 156/497 |
| 6,463,715 B1 * | 10/2002 | Petersson | 53/133.2 |
| 6,662,524 B1 | 12/2003 | Annehed et al. | |

* cited by examiner

*Primary Examiner*—Stephen F. Gerrity
*Assistant Examiner*—Thanh Truong
(74) *Attorney, Agent, or Firm*—Levenfeld Pearlstein, LLC (57) ABSTRACT

A linear fitment applicator for applying fitments to a series of containers being conveyed along a form, fill, and seal packaging machine includes an anvil, a fitment dispenser, a sealer, at least one drive source for moving the anvil, and a wedge. The containers are conveyed along the machine have at least one open end and at least one pre-incised hole for receiving a fitment. The anvil features a fitment engaging element and moves both vertically and horizontally. The wedge locks the anvil into position while the sealer fastens the fitments to the containers. A method for applying the fitments to the containers also is disclosed.

17 Claims, 10 Drawing Sheets

LINEAR FITMENT APPLICATOR AND METHOD

BACKGROUND OF THE INVENTION

The present invention is directed to an apparatus and method for applying fitments to a container. More particularly, the present invention pertains to an apparatus and method for linearly applying fitments to a gable top carton.

Form, fill, and seal packaging machines have been used for decades in the food packaging industry to package, for example, liquid foods such as milk or juice. In operation, these machines form or bottom seal containers from a blank (typically a heat-sealable plastic and paperboard laminate), fill the containers with a desired product and top seal the containers for subsequent distribution. Gable top cartons are among the most common types of containers formed, filled, and sealed by these machines.

Consumers have now come to expect that such containers include a resealable spout o fitment. Typically, such fitments include a cap to readily permit closing and sealing the container after initial opening of the container. These fitments are generally applied to the container at a station on the form, fill and seal packaging machine. At the applicator station, fitments are dispensed from a feed system to an applicator and moved into contact with the carton. The applicator typically includes a sealing device, such as an ultrasonic sealing or welding head, which moves into contact with the carton (on an exterior surface of the carton) while an accompanying fitment rests on an anvil that is moved into contact with an interior surface of the carton. Energy transmitted from the sealing device into the carton material above the fitment seals the fitment to the carton. An example of a form, fill, and seal packaging machine with such an applicator station is disclosed in U.S. Pat. No. 5,819,504 (the '504 patent), assigned to the assignee of the present invention and incorporated herein by reference.

Because many modem packaging machines operate at high speeds (some at speeds up to about 14,000 packages per hour), the spouts or fitments must be applied at a rate commensurate with the overall speed of the packaging machine, as well as precisely and accurately positioned. Many known fitment applicators are designed to place fitments into holes pre-cut into cartons at one station, and then to attach the fitments to the cartons at another station. One clear disadvantage of such a dual station applicator is the substantial additional space required to incorporate two additional stations into the limited and confined space of the packaging machine. Another disadvantage to dual station fitment applicators is the potential for a fitment to become displaced from its carton during transportation from the station at which the fitment is inserted into the carton to the station at which the fitment is attached to the carton.

Still another disadvantage to dual station fitment applicators is the necessity of indexed conveyance of the cartons to two additional stations. Recent fitment applicators such as the apparatus disclosed in the '504 patent have attempted to respond to these disadvantages. Though such devices may succeed in reducing the dual station fitment applicators to a single station they remain complex constructions, requiring several separate moving parts all subject to wear, and difficult to assemble and align.

Accordingly, there exists a need for a simple apparatus and method for linearly applying fitments to a carton. Desirably, such a fitment applicator for use with the method quickly and accurately selects and applies fitments at a single station. Such a fitment applicator is easy to assemble and align. More desirably, such a fitment applicator requires little space and a minimum of moving parts. Most desirably, such an fitment applicator also includes a means for locking the apparatus into position while fitments are sealed to the containers, increasing performance reliability and ensuring that the fitments are properly aligned during the sealing process.

BRIEF SUMMARY OF THE INVENTION

A linear fitment applicator for applying fitments to a series of containers being conveyed along a form, fill, and seal packaging machine includes an anvil, a fitment dispenser containing a plurality of fitments, a sealer, at least one drive source for moving the anvil, and a wedge. The containers being conveyed along the machine have at least one open end and at least one pre-incised hole for receiving a fitment. The anvil features a fitment engager, and may move both vertically and horizontally. The wedge locks the anvil into position while the sealer fastens the fitments to the containers. Preferably, application of the fitments to the containers is indexed to the conveyance of the containers along the machine.

In a preferred embodiment, the fitment engager is a lobe or sealing disc. The fitment engager is responsible for securely transporting the fitments from the fitment dispenser to the containers, inserting the fitments into the pre-incised holes of the containers, and holding the fitments steady while the sealer fastens the fitments to the containers. Most preferably, the containers are gabled top cartons. The fitment dispenser may include a pusher for placing the fitments onto the fitment engager. Most preferably, the fitments are spouted closures.

The at least one drive source may be a pneumatic cylinder. Preferably, the fitment applicator includes two drive sources: a first drive source for moving the anvil vertically, and a second drive source for moving the anvil horizontally. Most preferably, these two drive sources are pneumatic cylinders. The fitment applicator may further include a sealer drive source, for moving the sealer horizontally. The sealer drive source preferably also is a pneumatic cylinder. The sealer may be an ultrasonic welder.

A method for applying fitments to a series of containers being conveyed along a form, fill, and seal packaging machine also is disclosed. The containers used with the method each have at least one open end and at least one pre-incised hold for receiving a fitment. The method includes the steps of: (1) dispensing a fitment from a fitment dispenser to a picking position; (2) moving an anvil having a fitment engager toward the picking position linearly along a first horizontal plane, the picking position lying on the first horizontal plane; (3) moving the anvil linearly along the first horizontal plane to an upper vertical movement position; (4) moving the anvil vertically from the upper vertical movement position to a lower vertical movement position located along a second horizontal plane; (5) moving the anvil linearly along the second horizontal plane until the fitment mounted on the fitment engager is inserted through the at least one pre-incised hole; (6) moving a wedge into a locking position behind the anvil, to force the anvil to maintain a static position along the second horizontal plane; (7) sealing the fitment to the container; and (8) retracting the wedge to restore freedom of movement to the anvil.

The lower vertical movement position is located along a second horizontal plane through an upper open end of the container, along a vertical line perpendicular to the conveyance of the series of containers. The second horizontal plane is aligned with the at least one pre-incised hole. The step of placing the fitment onto the fitment engager of the anvil may be accomplished by thrusting the fitment onto the fitment engager with a pusher. Preferably, the container is a partially formed gabled top carton, and the fitment is a spouted closure.

Most preferably, the step of sealing the fitment to the container is accomplished by ultrasonically welding the fitment to the container. The method may include two additional steps. First, the method may further include the step of retracting the anvil along the second horizontal plane to the lower vertical movement position subsequent to the step of retracting the wedge. Second, the method may include the step of raising the anvil to the upper vertical movement position subsequent to the step of retracting the anvil to the lower vertical movement position.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

The present invention is designed to be a component of a form, fill, and seal machine, whether as an integrated component of a new machine or as an add-on component to an existing machine. Preferably, the present invention may be positioned between a station where containers are erected and a station where containers are filled. The fitment applicator disclosed herein has been designed to minimize the time and space necessary for its use, and to maximize the reliability of its function. To this end, the present fitment applicator provides for minimal translational movement and longitudinal oscillation of its components.

Figure 1:
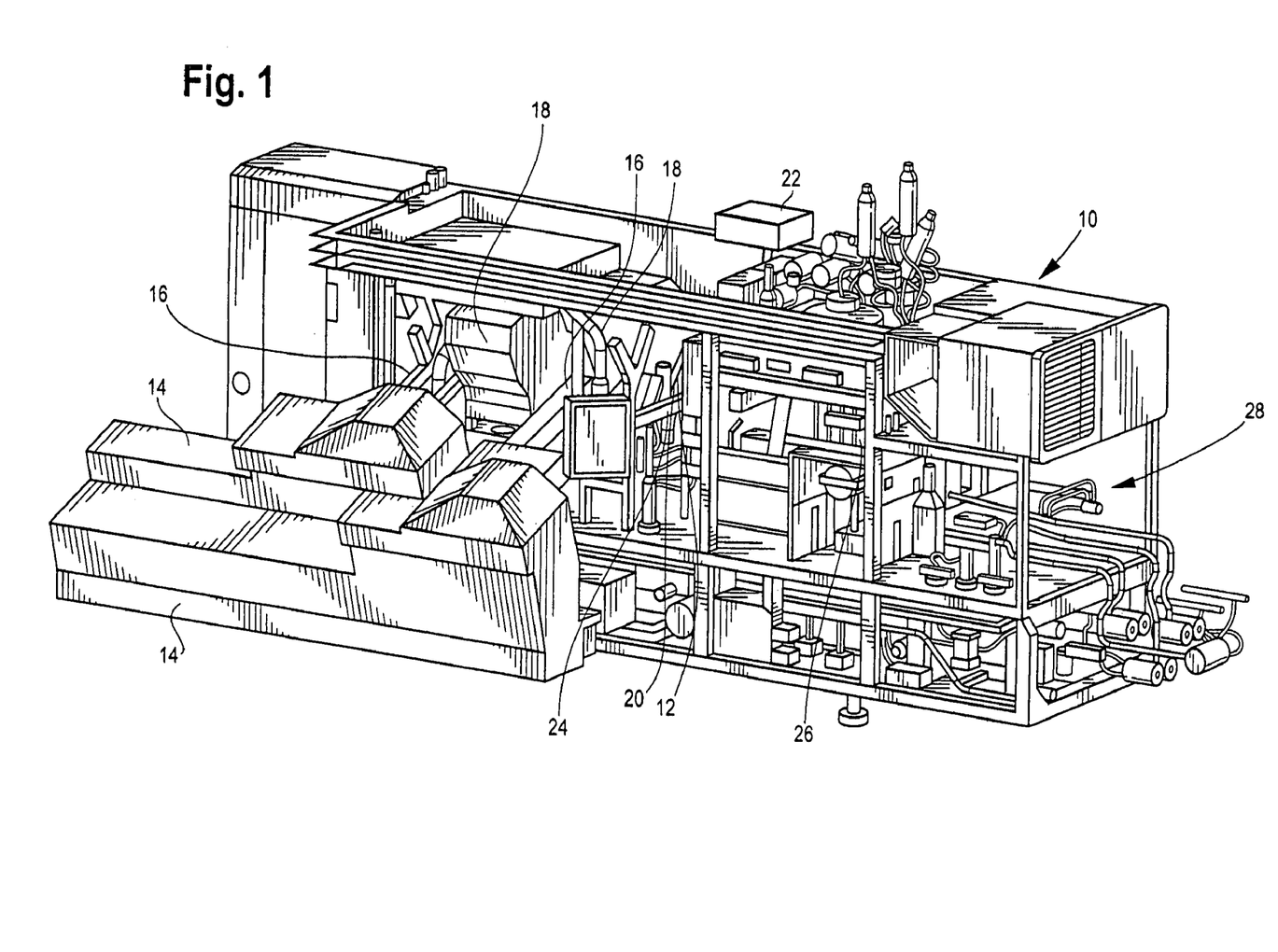
FIG. 1 is a perspective view of an exemplary form, fill, and seal packaging machine having a linear fitment applicator embodying the principles of the present invention.

Referring to the figures and in particular FIG. 1, there is shown a typical form, fill, and seal packaging machine 10. The packaging machine 10 includes a linear fitment applicator, indicated generally at 12, embodying the principles of the present invention. A typical form, fill, and seal packaging machine 10 includes a carton magazine 14 for storing flat, folded cartons prior to erection. The machine 10 further includes a carton erection station 16, a bottom flap sealing station 18, and a closure applicator station 20. The closure applicator station 20 preferably includes a closure storage region 22, a closure applicator 12, and a closure feed system or fitment dispenser 24. Subsequent to closure application, cartons may be sterilized, filled at a filling station 26, and sealed at a top sealing station 28 to form a well-known gable-top shape. Finally, cartons or containers are off-loaded from the machine 10. The construction and design of an exemplary machine is disclosed in Katsumata, U.S. Pat. No. 6,012,267, which patent is assigned to the assignee of the present invention, and which patent is incorporated herein by reference for purposes of that patent's disclosure of such a machine. As will be recognized by those skilled in the art, the illustrated machine 10 is a dual-line machine in which two lines or trains of cartons are processed side-by-side and simultaneously.

Figure 2:
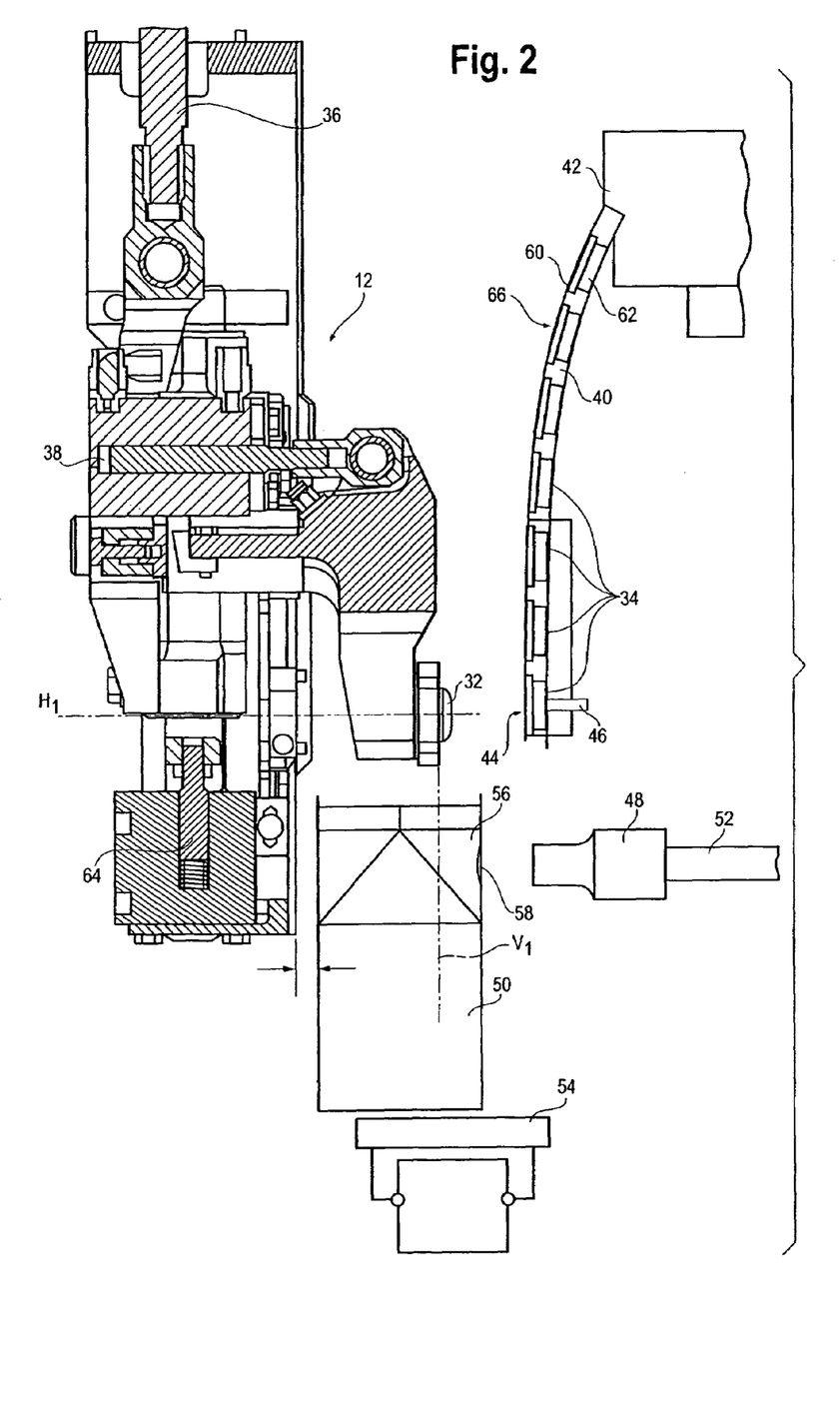
FIG. 2 is a side view of a linear fitment applicator embodying the principles of the present invention, the applicator shown at a starting, or neutral position.

Referring now to FIG. 2, there is shown a side view of a linear fitment applicator 12 of the present invention. The applicator 12 has an anvil or sealing disk 30, which is capable of translational movement and longitudinal oscillation. The anvil 30 has a fitment engaging element 32 extending from one surface of the anvil 30. The fitment engaging element 32 may be a lobe or sealing disc, used for securely holding fitments or closures 34. Preferably, the fitments or closures 34 are spouted-type closures.

Figure 5:
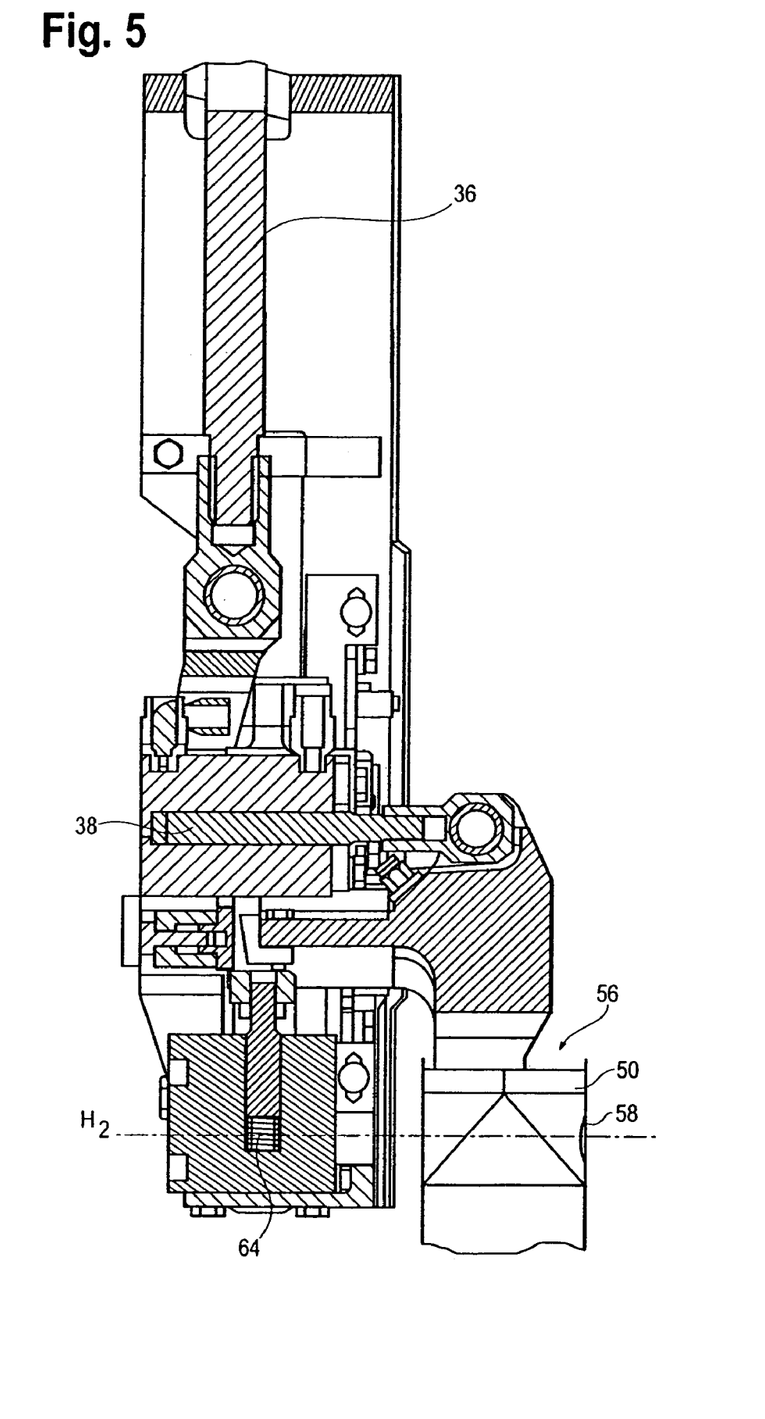
FIG. 5 illustrates a side view of the applicator of FIG. 1 at a third point in time.

The anvil 30 is operably mounted or connected from above to a first drive 36. The first drive 36 provides for longitudinal movement of the anvil 30 from a first horizontal plane $H_1$ (FIG. 2) to a second horizontal plane $H_2$ (FIG. 5). Translational movement of the anvil 30 is accomplished by a second drive 38, which also is operably mounted or connected to the anvil 30. In a present applicator, the first and second drives 36, 38 are pneumatic cylinders and are actuatable independent of each other. The anvil 30 may be moved along either horizontal plane $H_1$, $H_2$ from a forward position (as exemplified in FIG. 3) to a vertical pathway position (as exemplified in FIG. 2). Though the embodiment detailed in the diagrams includes two separate drive sources 36, 38, one for moving the anvil 30 horizontally and the other for moving the anvil 30 vertically, a single drive source that moves the anvil both horizontally and vertically could be substituted. The movement of the anvil 30 will be more thoroughly described in FIGS. 3–10.

Still referring to FIG. 2, a fitment dispenser or closure feed system is generally designated 24. As illustrated with the present embodiment, the fitment dispenser 24 is composed of a chute 40 that transports fitments 34 from a fitments feeder 42 (not shown) to a picking position 44 located on the first horizontal plane $H_1$ at one end of the chute 40. Upon arrival at the picking position 44, the closure 34 is ready to be received on the fitment engaging element 32. Optionally, the fitment dispenser 24 may include a pusher 46 for urging the fitments 34 into engagement with the fitment engaging element 32. Though a specific variety of fitment dispenser 24 is shown with the fitment applicator 12 of the present invention, many different styles of fitment dispensers or closure feed systems may be used.

Preferably, a sealer 48 for fastening a fitment 34 to a container 50 is an ultrasonic welder. Other types of sealers, such as heaters for heat sealing the fitment 34 to the container 50, also may be used. The sealer 48 is operably mounted or connected to a sealer drive source 52, which preferably is a pneumatic cylinder. The sealer drive source 52 moves the sealer 48 horizontally, both toward and away from the container 50 (fitment 34) to be sealed.

The containers 50 are conveyed to a position below the fitment applicator 12 by a conveyor belt or chain drive 54. Preferably, each container 50 is a partially constructed gable top carton, and has an open top end 56 to permit passage of the anvil 30. Each container 50 also has a pre-incised hole 58 formed in the container for placement of the fitment 34. A typical fitment 34 has a flanged end 60 (see FIG. 11) for positioning against an interior wall of the container, so that a spout 62 protrudes through the hole 58. The fitment applicator 12 further includes a wedge 64 that is located behind the anvil 30. The wedge 64 locks the anvil 30 into position while the sealer 48 moves into contact with the container 50 as the fitment 34 is sealed to the container 50.

Figure 3:
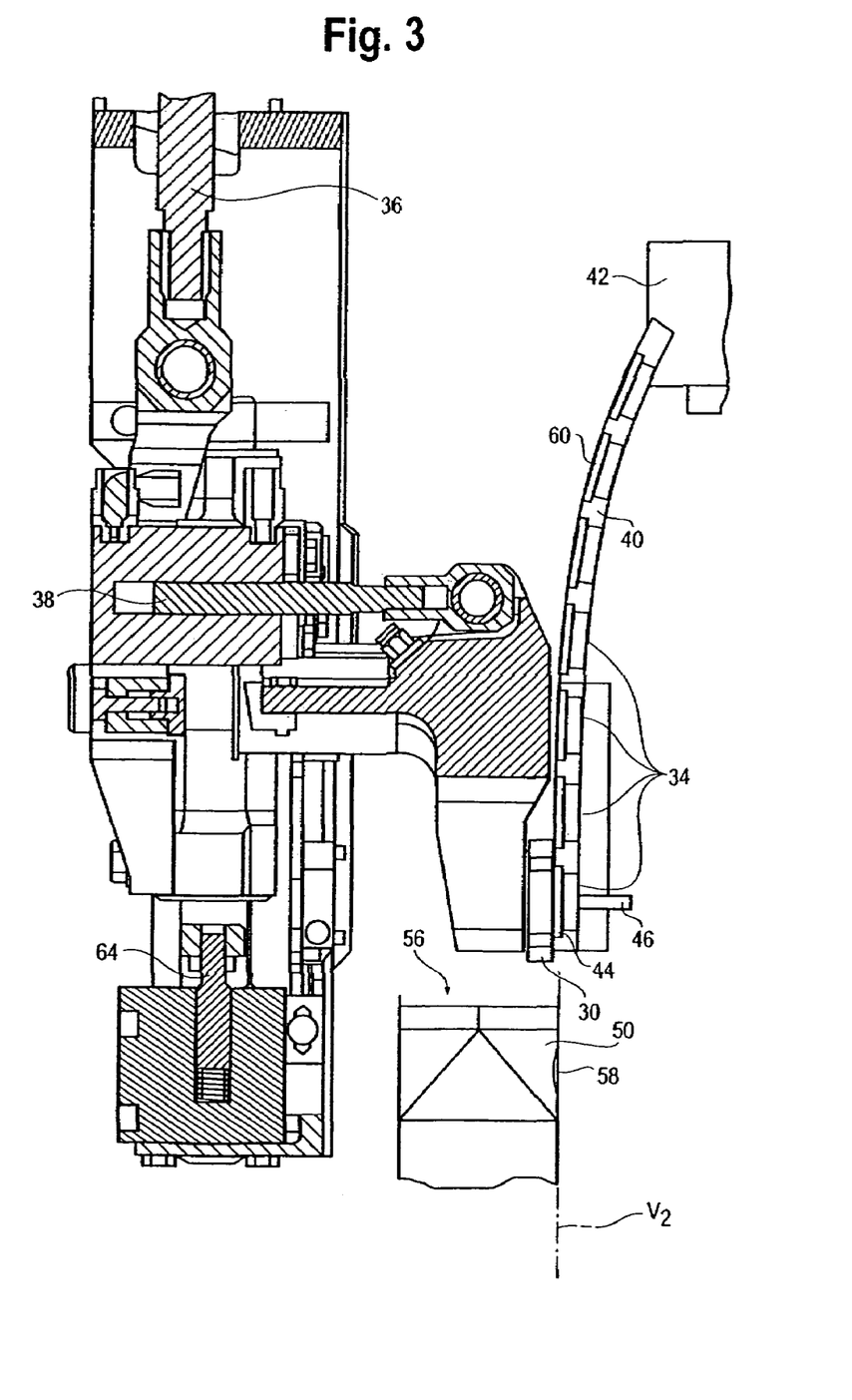
FIG. 3 illustrates a side view of the applicator of FIG. 1 at a first point in time.

A method of using the fitment application 12 of the present invention to apply fitments 34 to a series of containers 50 is illustrated in FIGS. 2–10. FIG. 2 shows the fitment applicator 12 at rest in a neutral, or zero position. FIG. 3 illustrates the fitment applicator 12 at a first point in time (a picking position). At this first point in time, the second drive 38 has moved the anvil 30 horizontally to a picking position (as indicated at 44) along the first horizontal plane $H_1$. The protruding fitment engaging element 32 receives a fitment 34 that has been dispensed by the fitment dispenser 24 at the picking position 44 by coupling itself with (in) a cavity 66 (see FIG. 11) formed inside of the fitment spout 62. Alternately, a pusher 46 may be used to urge the fitment 34 onto the fitment engaging element 32. The fitment 34 thus is firmly secured to the fitment engaging element 32, permitting the engaging element 32 to securely transport the fitment 34.

Figure 4:
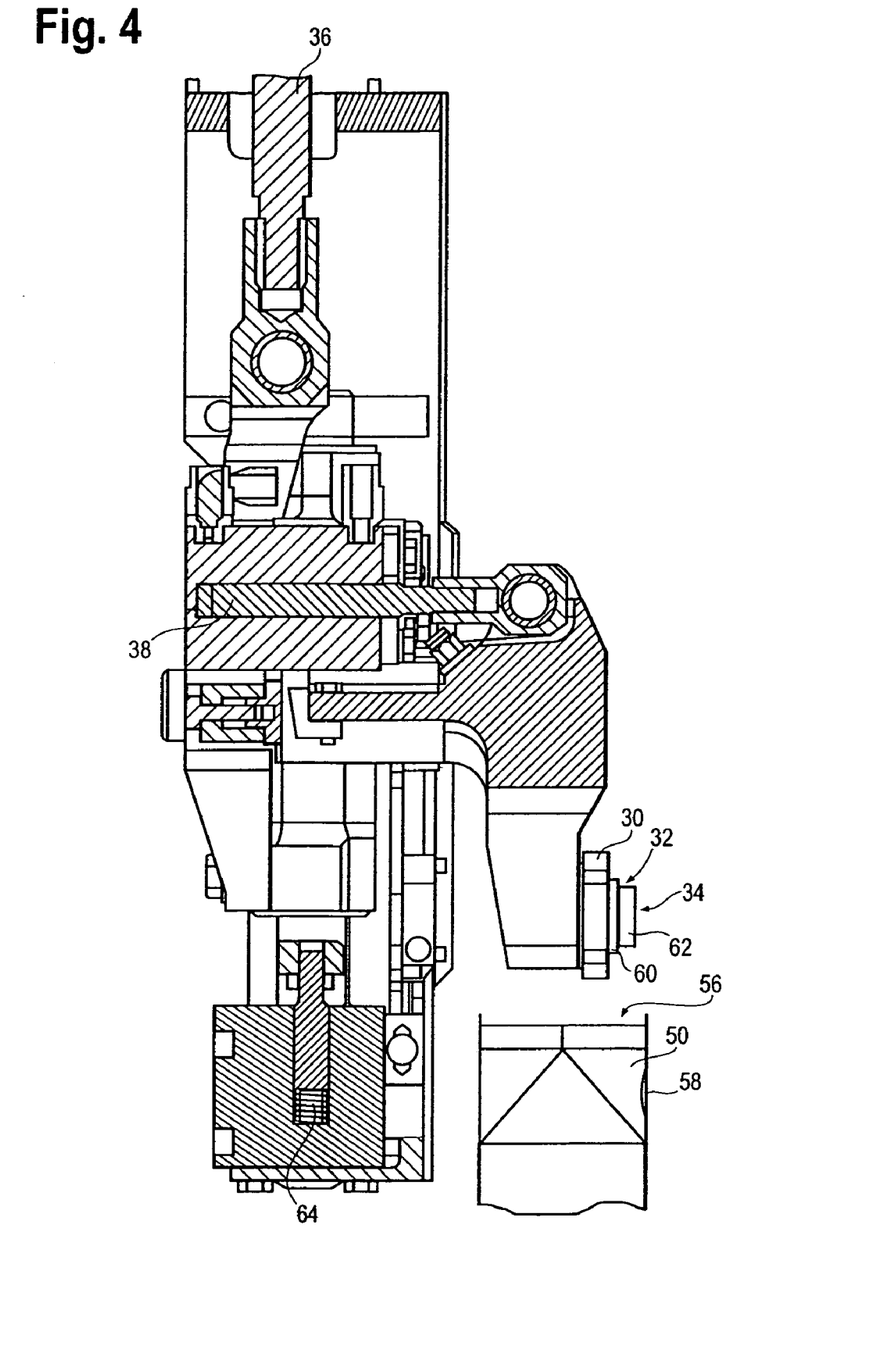
FIG. 4 shows a side view of the applicator of FIG. 1 at a second point in time.

Turning now to FIG. 4, the second drive 38 has retracted the anvil 30, with a fitment 34 covering its fitment engaging element 32, linearly along the first horizontal plane $H_1$ to an upper vertical movement position at a second point in time. At the upper vertical movement position, the anvil 30 is positioned on a longitudinal pathway in preparation for descent through the open end 56 of the container 50. The time and space saving features of the present invention are apparent from the minimal distance the anvil 30 retracts from the picking position 44 to the upper vertical movement position. In addition, the potential for fitment 34 loss from the fitment engaging element 32 is significantly reduced because the anvil 30 is subject to minimal movement.

In FIG. 5, the first drive 36 actuates to lower the anvil 30 along a vertical line perpendicular to the conveyance of the series of containers 50 at a third point in time. The anvil 30 has passed through the open end 56 of a container 50 to a lower vertical movement position located in the interior of the container. The lower vertical movement position falls along the second horizontal plane $H_2$, and is aligned with the pre-incised hole 58 of the container 50. The anvil 30 descends to the lower vertical movement position substantially without any translational (e.g., horizontal) movement. As noted above, the time and space saving features of the present invention are apparent from the minimal distances the anvil 30 is moved (along a vertical pathway in this instance as opposed to the previously addressed horizontal pathway). Again, the potential for fitment 34 loss is greatly decreased because the anvil 30 and fitment engaging element 32 travel only minimal distances.

Figure 6:
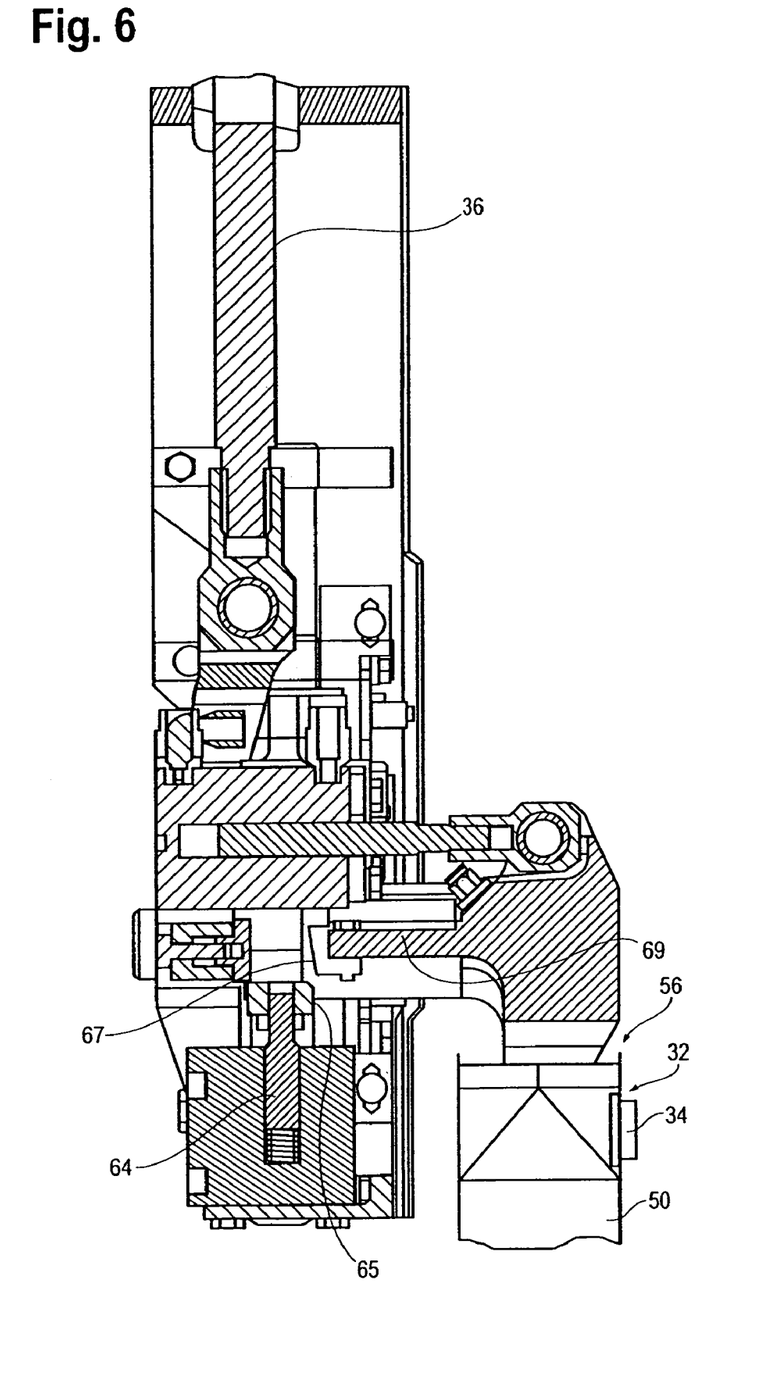
FIG. 6 is a side view of the applicator of FIG. 1 at a fourth point in time.

As seen in FIG. 6, at a fourth point in time, the second drive 38 has actuated to move the anvil 30 linearly forward along the second horizontal plane $H_2$ until the flange 60 of the fitment 34 (as it is secured to the fitment engaging element 32) rests firmly against an interior wall of the container 50, with the spout 62 protruding through the pre-incised hole 58 of the container. Once the closure 34 is in this position, it is ready for permanent attachment (i.e., sealing) to the container 50. The distance the anvil 30 travels along the second horizontal plane $H_2$ from the lower vertical movement position to the pre-incised hole 58 is substantially equal to the distance the anvil 30 travels from the picking position 44 rearward to the upper vertical movement position (as show in FIGS. 3–4). This design significantly simplifies the programming required for the second drive 38, as all translational movement occurs substantially between only two points.

Figure 7:
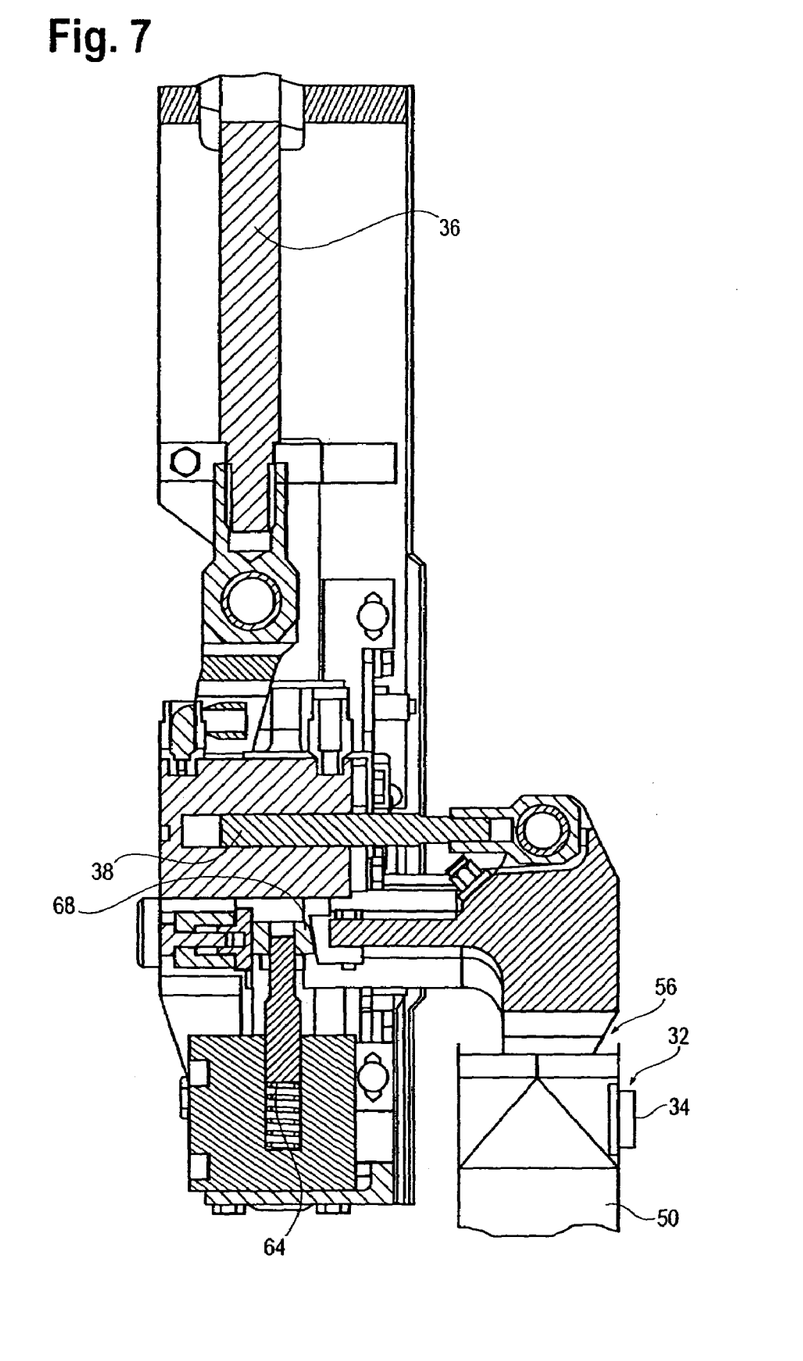
FIG. 7 shows a side view of the applicator of FIG. 1 at a fifth point in time.

FIG. 7 depicts the next step at a fifth point in time. The wedge 64 has risen and occupies a locking position 68 behind the anvil 30, forcing the anvil to maintain a static position (a welding position) along the second horizontal plane $H_2$. The wedge 64 assists secures the anvil 30 in the welding position by interfering with or preventing rearward movement of the anvil 30. A present wedge 64 has an inclined face 65 (see FIG. 6) that cooperates with an inclined face 67 (also shown in FIG. 6) on the anvil arm 69 to lock the anvil in the welding position.

Figure 8:
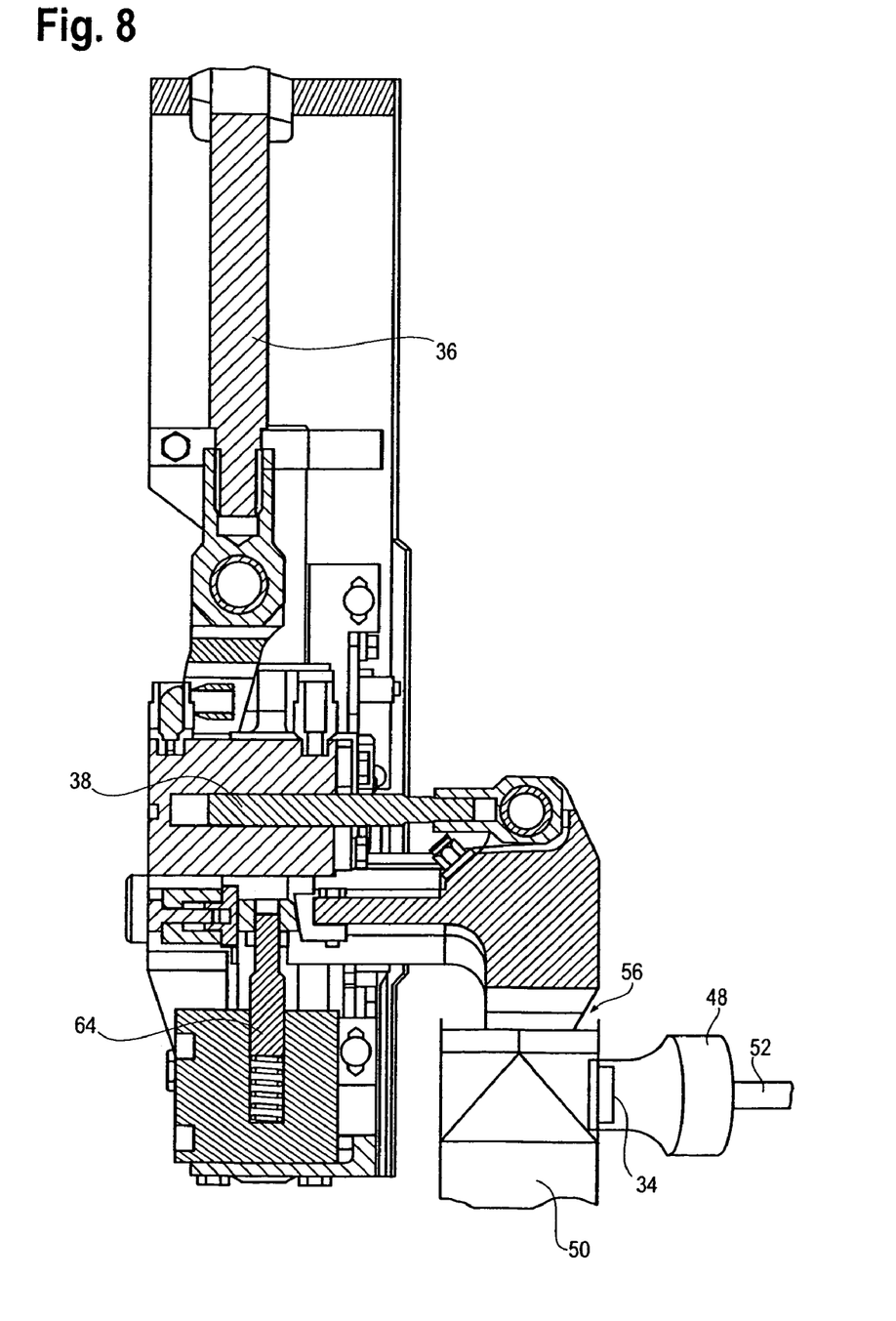
FIG. 8 illustrates a side view of the applicator of FIG. 1 at a sixth point in time.
Figure 9:
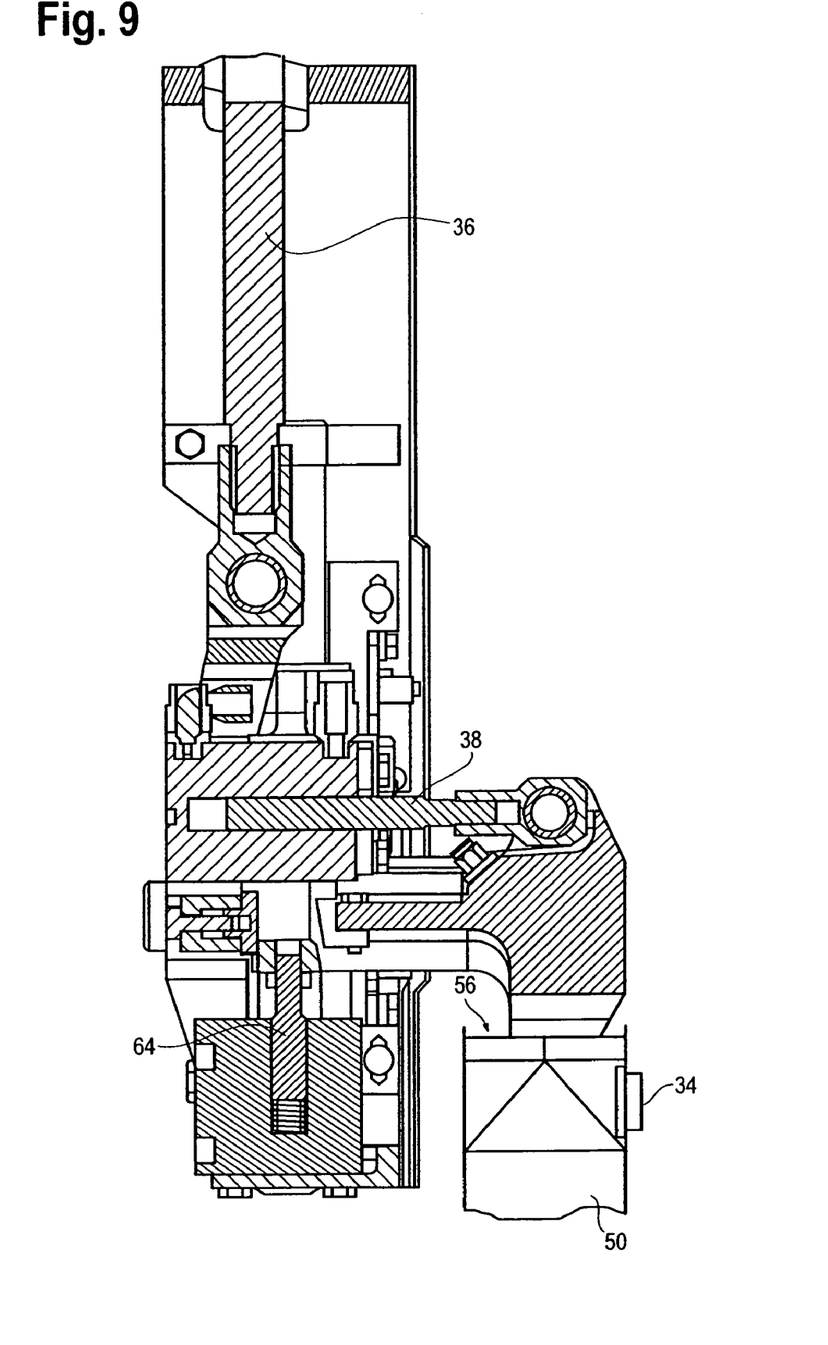
FIG. 9 is a side view of the applicator of FIG. 1 at a seventh point in time.

Referring now to FIG. 8, a sixth point in time, the sealer 48 has been moved forward along the second horizontal plane $H_2$ by the sealer drive 52, so that the sealer is positioned firmly against an exterior wall of the container 50, generally over the fitment spout 62. Once placed against the container 50, the sealer 48 is actuated to seal the fitment 34 to the container 50. In a present machine 10, the sealer 48 is an ultrasonic sealer that emits ultrasonic energy that vibrates for a predetermined time, at a frequency sufficient to weld the flange 60 of the fitment 34 to the interior wall of the container. The flange 60 of the fitment 34 is buttressed by the anvil 30, which has sufficient inertia to allow for proper welding of the flange of the fitment 34 to the interior wall of the container 50. The fitment engaging element 32 holds the fitment 34 steady while the sealer 48 operates (vibrates), ensuring that the fitment is welded securely to the container 50. Once the fitment 34 is properly welded to the container 50, the sealer drive 52 retracts the sealer 48, and the wedge 64 retracts from its locking position 68 behind the anvil 30, permitting the anvil to once again move freely (FIG. 9).

Figures 10, 11:
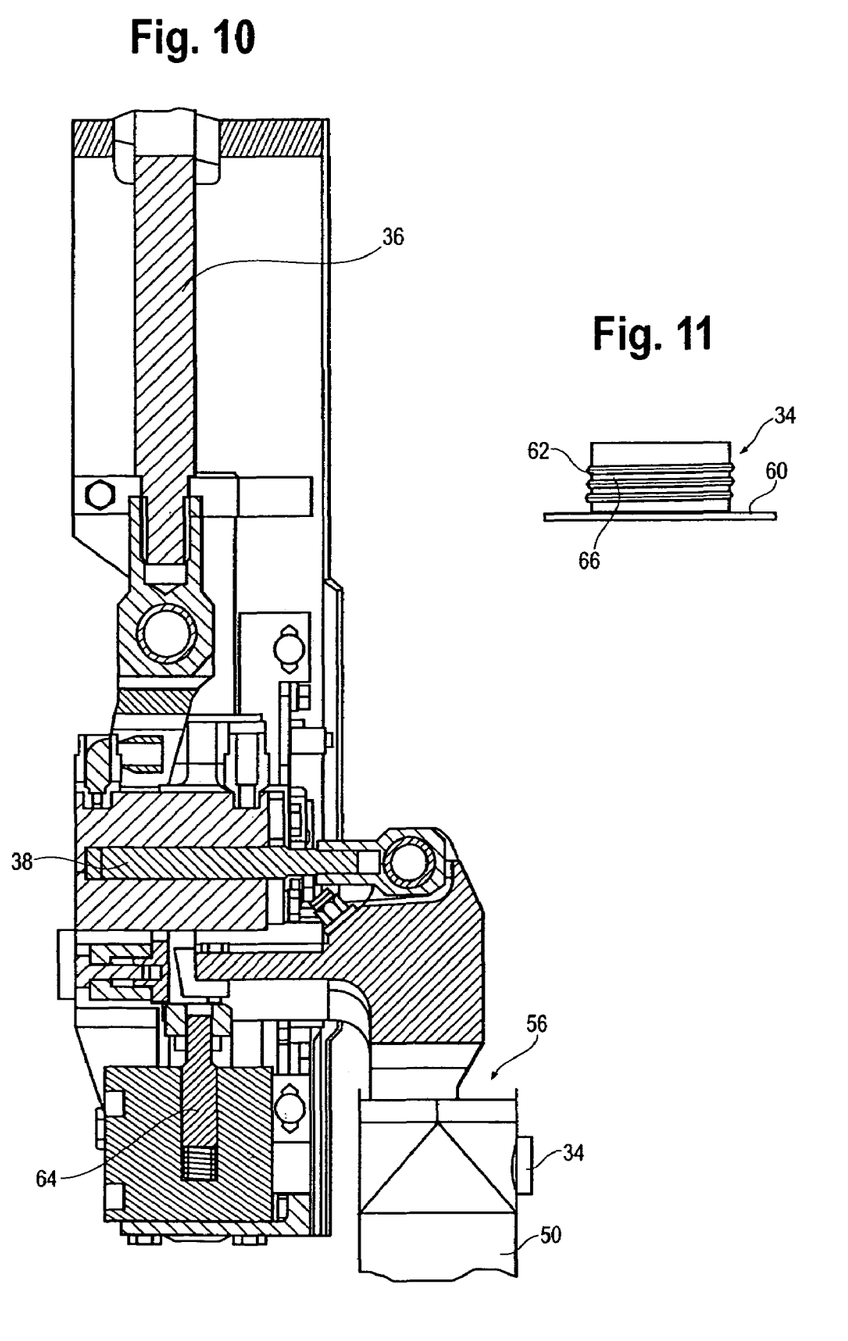
FIG. 10 shows a side view of the applicator of FIG. 1 at an eighth point in time.
FIG. 11 illustrates an exemplary fitment suitable for use with the present fitment applicator.

In FIG. 10, the second drive 38 has actuated, retracting the anvil 30 along the second horizontal plane $H_2$ to the lower vertical movement position, thereby disengaging the fitment 34, which now is welded to the container 50, from the fitment engager 32. Finally, the first drive 36 actuates to return the anvil 30 along the vertical line to the upper vertical movement position, which is the neutral, or "zero" position of the anvil, as seen in FIG. 2. Once the anvil 30 has been removed from the interior of the container 50 and ascended to its neutral position, the container 50 is conveyed down the line to a subsequent station on the form, fill, and seal machine 10. A subsequent container 50 is then moved into place at the applicator 12. Preferably, the anvil 30, the fitment dispenser 24, the sealer 48, the first and second drives 36, 38, and the wedge 64 all are positioned at a single machine station. Most preferably, the application of the fitments 34 to the containers 50 is indexed to the conveyance of the containers along the machine 10.

Advantageously, the present applicator 12 requires less moving parts than known applicators, and has been shown to be capable of operating at desired line speeds. Moreover, it has also been found that the present applicator, because of its short stroke, and because it does not include or use pivot points (i.e., does not use rotational movement), is more reliable than known applicators.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A linear fitment applicator for applying a fitment to a container being conveyed along a form, fill, and seal packaging machine, the container having at least one open end and a pre-incised hole for receiving the fitment, the fitment applicator comprising:
    an anvil having a fitment engaging element for receiving and engaging the fitment, the anvil being movable in a vertical plane between a picking height and a welding height, and being movable in a horizontal plane between a rearward conveying position and a forward welding/picking position, which vertical and horizontal movements are independent of one another;
    a fitment dispenser for supplying a fitment to the anvil;
    a sealer for fastening the fitment to the container;
    a vertical drive for moving the anvil between the picking height and the welding height,
    a horizontal drive for moving the anvil between the rearward conveying position and the forward welding/picking position; and
    a wedge for locking the anvil into the forward welding/picking position when the sealer fastens the fitments to the containers.

2. The fitment applicator in accordance with claim 1, wherein the fitment engaging element is a lobe or sealing disc used for holding the fitment as the anvil moves from the fitment dispenser to the container, and as the fitment is inserted into the pre-incised hole in the carton, and holding the fitment while the sealer fastens the fitment to the container.

3. The fitment applicator in accordance with claim 1, wherein the fitment dispenser includes a pusher for urging the fitment onto the fitment engaging element.

4. The fitment applicator in accordance with claim 1, wherein the sealer is an ultrasonic welder.

5. The fitment applicator in accordance with claim 1, wherein the vertical drive is a pneumatic cylinder.

6. The fitment applicator in accordance with claim 1, wherein the horizontal drive is a pneumatic cylinder.

7. The fitment applicator in accordance with claim 1, including a sealer drive for moving the sealer horizontally.

8. The fitment applicator in accordance with claim 7, wherein the sealer drive is a pneumatic cylinder.

9. The fitment applicator in accordance with claim 1, wherein the application of the fitments to the containers is indexed to the conveyance of the containers along the machine.

10. The fitment applicator in accordance with claim 1, wherein the fitments are spout-type resealable closures.

11. The fitment applicator in accordance with claim 1, wherein the anvil, the fitment dispenser, the sealer, and the vertical and horizontal drives, and the wedge all are positioned at a single station of a multiple station form, fill, and seal packaging machine.

12. A method for applying fitments to a series of containers being conveyed along a form, fill, and seal packaging machine, each of the containers having at least one open end and at least one pre-incised hole for receiving a fitment, the method comprising the following steps:
    dispensing a fitment from a fitment dispenser to a picking position;
    moving an anvil having a fitment engaging element forward to extend the fitment engaging element toward the picking position linearly along a first level horizontal plane, the picking position lying on the first horizontal plane;
    positioning the fitment engaging element of the anvil into a fitment;
    moving the anvil rearward, linearly along the first horizontal plane, retracting the anvil to an upper vertical movement position;
    moving the anvil vertically from the upper vertical movement position to a lower vertical movement position, wherein the lower vertical movement position is located along a second horizontal plane through an upper open end of the container along a vertical line perpendicular to the conveyance of the series of containers, the second horizontal plane being aligned with the at least one pre-incised hole;
    moving the anvil linearly forward along the second horizontal plane to extend the anvil so that the fitment mounted on the fitment engaging element is inserted through the at least one pre-incised hole;
    moving a wedge into a locking position behind the anvil, to secure the anvil in place horizontally preventing rearward movement of the anvil and maintaining the anvil in a static position along the second horizontal plane;
    sealing the fitment to the container; and
    retracting the wedge to restore rearward freedom of movement to the anvil.

13. The method of claim 12, wherein the step of placing the fitment onto the fitment engaging element of the anvil is accomplished by thrusting the fitment onto the fitment engager with a pusher.

14. The method of claim 12, wherein the step of sealing the fitment to the container is accomplished by ultrasonically welding the fitment to the container.

15. The method of claim 12, further comprising the step of retracting the anvil along the second horizontal plane to the lower vertical movement position subsequent to the step of retracting the wedge.

16. The method of claim 15, further comprising the step of raising the anvil to the upper vertical movement position subsequent to the step of retracting the anvil to the lower vertical movement position.

17. The method of claim 12, wherein the application of the fitments to the containers is indexed to the conveyance of the containers along the machine.

* * * * *